(12) United States Patent
Fukaya

(10) Patent No.: US 10,411,762 B2
(45) Date of Patent: Sep. 10, 2019

(54) ELECTRONIC APPARATUS

(71) Applicant: CANON KABUSHIKI KAISHA, Tokyo (JP)

(72) Inventor: Yudai Fukaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 14/855,817

(22) Filed: Sep. 16, 2015

(65) Prior Publication Data

US 2016/0087688 A1    Mar. 24, 2016

(30) Foreign Application Priority Data

Sep. 22, 2014 (JP) ................. 2014-193070
Apr. 3, 2015 (JP) ................. 2015-077212

(51) Int. Cl.
*H02J 50/12* (2016.01)
*H02J 7/02* (2016.01)
*H04B 5/00* (2006.01)

(52) U.S. Cl.
CPC ............ *H04B 5/0037* (2013.01); *H02J 7/025* (2013.01); *H02J 50/12* (2016.02)

(58) Field of Classification Search
CPC .... H02J 5/00; H02J 5/005; H02J 7/025; H02J 7/02; H02J 17/00; H04B 5/00; H04B 5/0037; G05F 1/62; G01N 21/6428; H05B 33/0815; H05B 33/0845
USPC ......... 307/104, 9.1, 10.1, 80, 64, 66, 43, 86; 320/108, 109, 110, 137, 139
See application file for complete search history.

(56) References Cited

U.S. PATENT DOCUMENTS

| | | | |
|---|---|---|---|
| 8,983,374 B2 | 3/2015 | Wiley | |
| 2007/0228833 A1* | 10/2007 | Stevens | H02J 5/005 307/45 |
| 2010/0041418 A1 | 2/2010 | Edge et al. | |
| 2012/0056485 A1 | 3/2012 | Haruyama | |

(Continued)

FOREIGN PATENT DOCUMENTS

| | | | |
|---|---|---|---|
| JP | 2012-060721 A | 3/2012 | |
| JP | 2012-196031 A | 10/2012 | |

(Continued)

OTHER PUBLICATIONS

U.S. Appl. No. 14/856,498, filed Sep. 16, 2015; Inventor: Yudai Fukaya.

(Continued)

*Primary Examiner* — Fritz M Fleming
*Assistant Examiner* — Jagdeep S Dhillon
(74) *Attorney, Agent, or Firm* — Venable LLP

(57) ABSTRACT

An electronic apparatus includes an antenna that wirelessly receives power; a power control unit that accumulates or supplies power received by the antenna by inputting power; a communication unit that communicates with a power supply apparatus via the antenna; a switching unit that switches between a path from the antenna to the power control unit and a path from the antenna to the communication unit; and a driving unit that operates with power received by the antenna and drive the switching unit, wherein an input impedance of the driving unit viewed from the antenna is higher than an input impedance of the power control unit viewed from the antenna or an input impedance of the communication unit viewed from the antenna.

9 Claims, 10 Drawing Sheets

(56) References Cited

U.S. PATENT DOCUMENTS

| | | | |
|---|---|---|---|
| 2012/0149301 A1 | 6/2012 | Wiley | |
| 2012/0235508 A1 | 9/2012 | Ichikawa | |
| 2013/0033235 A1 | 2/2013 | Fukaya | |
| 2014/0375257 A1* | 12/2014 | Akiyama | H02J 5/005 320/108 |
| 2015/0022017 A1* | 1/2015 | Kim | H02J 5/005 307/104 |
| 2015/0130292 A1* | 5/2015 | Yeon | G05F 1/62 307/104 |
| 2015/0180285 A1* | 6/2015 | Yamakawa | H02J 17/00 307/104 |
| 2015/0239354 A1* | 8/2015 | Gorai | B60L 3/00 307/10.1 |
| 2015/0357829 A1 | 12/2015 | Makita | |
| 2015/0366014 A1* | 12/2015 | Itoh | H05B 33/0815 315/200 R |
| 2016/0141882 A1* | 5/2016 | Ichikawa | H02J 7/025 307/104 |
| 2017/0025903 A1* | 1/2017 | Song | H02J 50/40 |

FOREIGN PATENT DOCUMENTS

| | | |
|---|---|---|
| JP | 2013-38854 A | 2/2013 |
| JP | 5308588 B1 | 10/2013 |
| JP | 2013-252001 A | 12/2013 |
| JP | 2014-504495 A | 2/2014 |
| WO | 2012/082570 A1 | 6/2012 |

OTHER PUBLICATIONS

U.S. Appl. No. 14/855,817, filed Sep. 16, 2015; Inventor: Yudai Fukaya.

Office Action in Japanese Patent Application No. 2014-193070, dated Jul. 6, 2018.

* cited by examiner

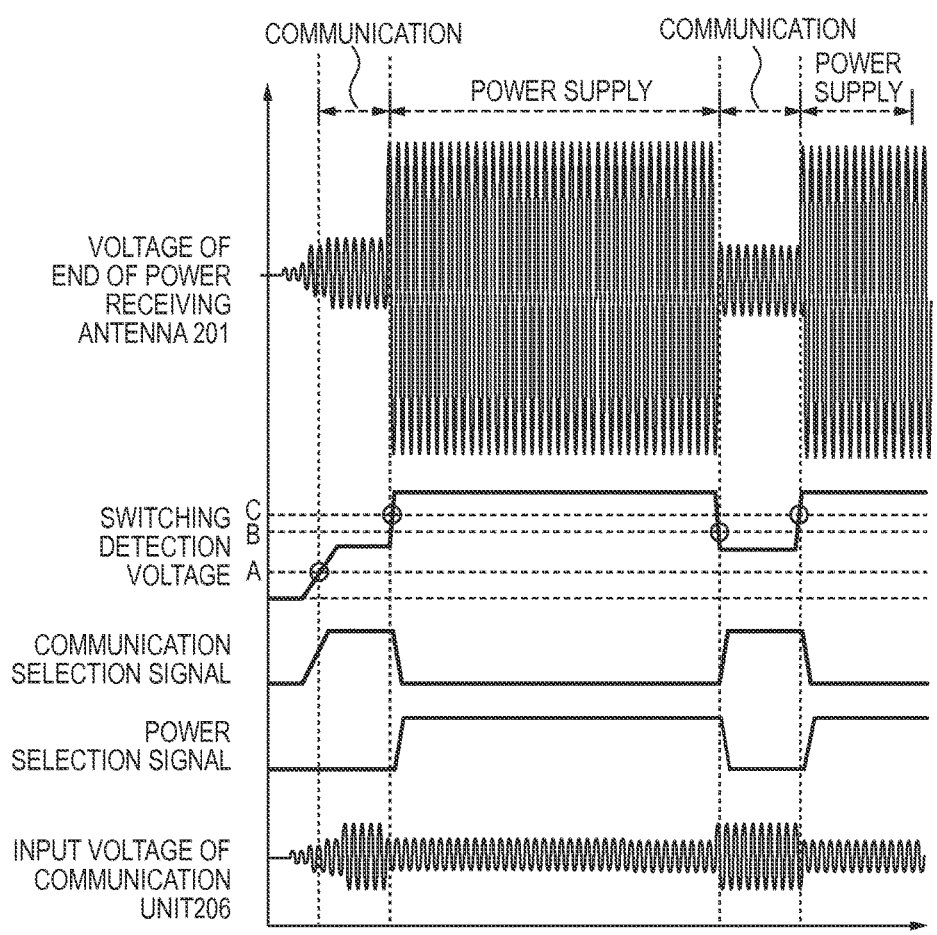

ELECTRONIC APPARATUS

BACKGROUND

Field of the Invention

The present invention relates to an electronic apparatus for wirelessly receiving power.

Description of the Related Art

In recent years, there is known a wireless power supply system which includes a power supply apparatus having, as an antenna, a primary coil for wirelessly outputting power without performing physical connection by a connector, and an electronic apparatus having, as an antenna, a secondary coil for wirelessly receiving power supplied from the power supply apparatus. There is also known a wireless power supply system in which communication is performed by the antennas in addition to power transmission of wireless power supply using the antennas.

Such electronic apparatus alternately performs wireless communication for notifying the power supply apparatus of the state of the electronic apparatus and power reception from the power supply apparatus by using one antenna (Japanese Patent Laid-Open No. 2013-38854).

The electronic apparatus described above supplies, to a communication unit, power for communication supplied from the power supply apparatus when communication is performed, and charges a battery using power supplied from the power supply apparatus while power for charging the battery is received from the power supply apparatus.

However, the power supply apparatus may supply the power for charging the battery to the communication unit of the electronic apparatus, and excess power may be supplied to the communication unit. In this case, the communication unit of the electronic apparatus may not be able to perform normal communication, and it is thus necessary to prevent excess power from being supplied to the communication unit of the electronic apparatus. Furthermore, the power supply apparatus may supply the power for communication to the battery, and the power supplied from the power supply apparatus may become short as power for charging the battery.

SUMMARY

According to an aspect of the present invention, an apparatus and method capable of controlling a destination of power supplied from a power supply apparatus are provided.

According to an aspect of the present invention, an apparatus and method capable of controlling a destination of power supplied from a power supply apparatus so as to appropriately perform communication and appropriately charge a battery are provided.

According to an aspect of the present invention, there is provided an electronic apparatus comprising: an antenna that wirelessly receives power; a power control unit that accumulates or supplies power received by the antenna by inputting power; a communication unit that communicates with a power supply apparatus via the antenna; a switching unit that switches between a path from the antenna to the power control unit and a path from the antenna to the communication unit; and a driving unit that operates with power received by the antenna and drive the switching unit, wherein an input impedance of the driving unit viewed from the antenna is higher than an input impedance of the power control unit viewed from the antenna or an input impedance of the communication unit viewed from the antenna.

According to an aspect of the present invention, there is provided an electronic apparatus comprising: an antenna that wirelessly receives power; a power control unit that accumulates or supplies power received by the antenna by inputting power; a communication unit that communicates with a power supply apparatus via the antenna; a switching unit that switches between a path from the antenna to the power control unit and a path from the antenna to the communication unit; and a driving unit that drives the switching unit, wherein the driving unit is connected to the antenna via a conversion element that converts an impedance.

Further features and aspects of the present invention will become apparent from the following description of exemplary embodiments.

BRIEF DESCRIPTION OF THE DRAWINGS

The drawings, which are incorporated in and constitute a part of the specification, illustrate exemplary embodiments, features, and aspects of the present invention.

FIG. 7 is an illustration showing voltage waveforms in the first and second embodiments;

DESCRIPTION OF THE EMBODIMENTS

Exemplary embodiments, features, and aspects of the present invention will be described below with reference to the drawings.

First Embodiment (Description of System Configuration)

Figure 1:
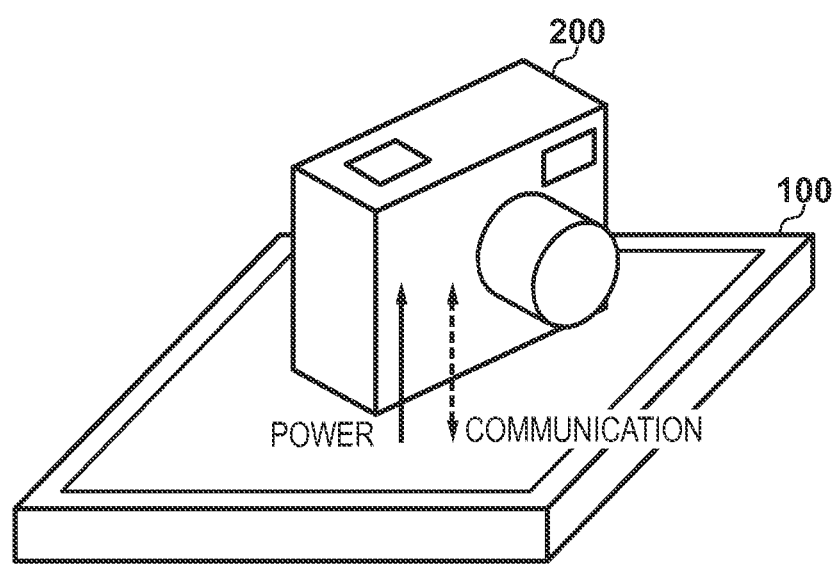
FIG. 1 a diagram for illustrating an example of a configuration of a wireless power supply system in first and second embodiments.

The first embodiment will be described below with reference to the accompanying drawings. As shown in FIG. 1, a wireless power supply system in the first and second embodiments includes an electronic apparatus 200 and a power supply apparatus 100 for wirelessly supplying power to the electronic apparatus 200. The power supply apparatus 100 can wirelessly communicate with the electronic apparatus 200 to control power supply to the electronic apparatus.

In a case where the distance between the power supply apparatus 100 and the electronic apparatus 200 falls within a predetermined range, the power supply apparatus 100 having a power supply antenna 101 performs wireless communication via the power supply antenna 101, and determines whether the electronic apparatus 200 is an apparatus capable of receiving power. If the power supply apparatus 100 determines that the electronic apparatus 200 is an apparatus capable of receiving power, it outputs power for power supply via the power supply antenna 101 to supply the power to the electronic apparatus 200.

The electronic apparatus 200 having a power receiving antenna 201 wirelessly accepts, via the power receiving antenna 201, the power output from the power supply apparatus 100.

If the distance between the power supply apparatus 100 and the electronic apparatus 200 falls within the predetermined range, the power supply apparatus 100 outputs small power at regular intervals to detect whether the electronic apparatus 200 falls within the predetermined range.

Note that the predetermined range is a range where the electronic apparatus 200 can perform communication with power for communication supplied from the power supply apparatus 100.

If the electronic apparatus 200 is an electronic apparatus which operates with power supplied from a secondary battery 404, it may be an image capture apparatus such as a digital still camera or digital video camera, or a playback apparatus such as a player for playing back audio data and image data. Alternatively, the electronic apparatus 200 may be a mobile phone or smartphone, or a moving apparatus like a car. The electronic apparatus 200 may be a mouse or loudspeaker which has no secondary battery and operates with received power.

(Arrangement of Power Supply Apparatus 100)

Figure 2A:
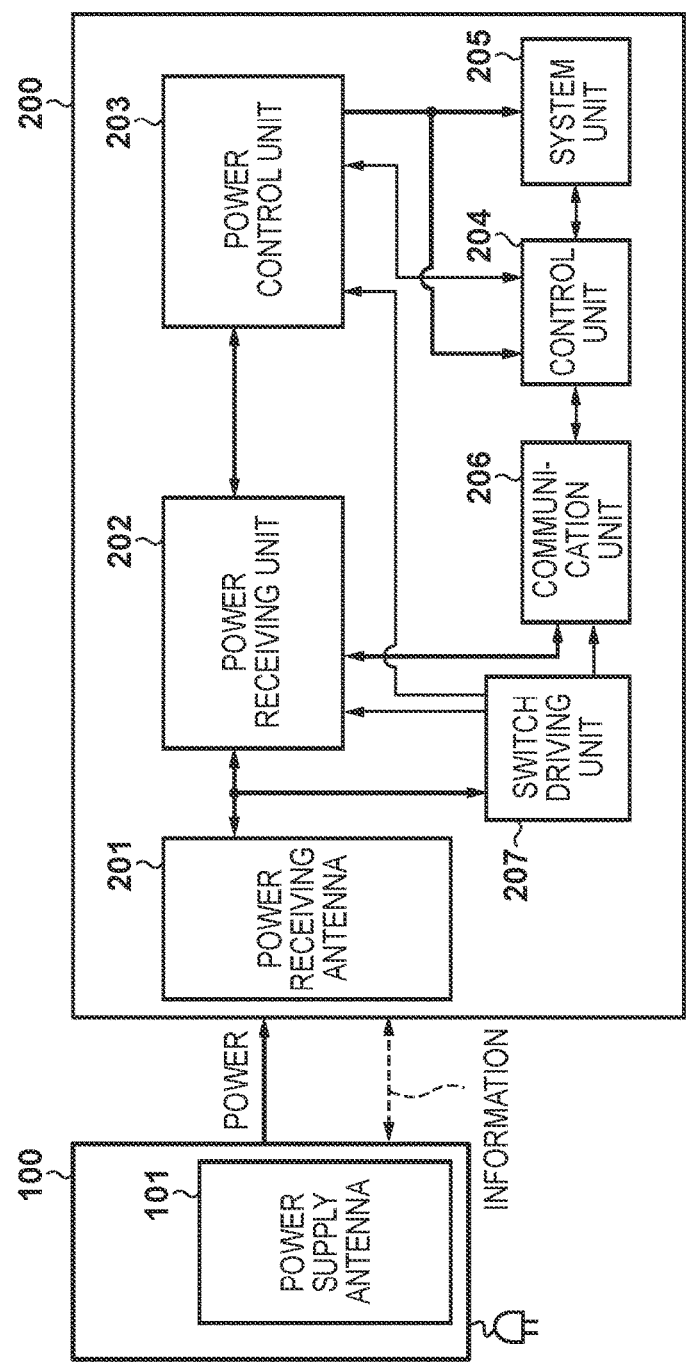
FIG. 2A is a block diagram for illustrating an example of the configuration of the wireless power supply system in the first embodiment.
Figure 2B:
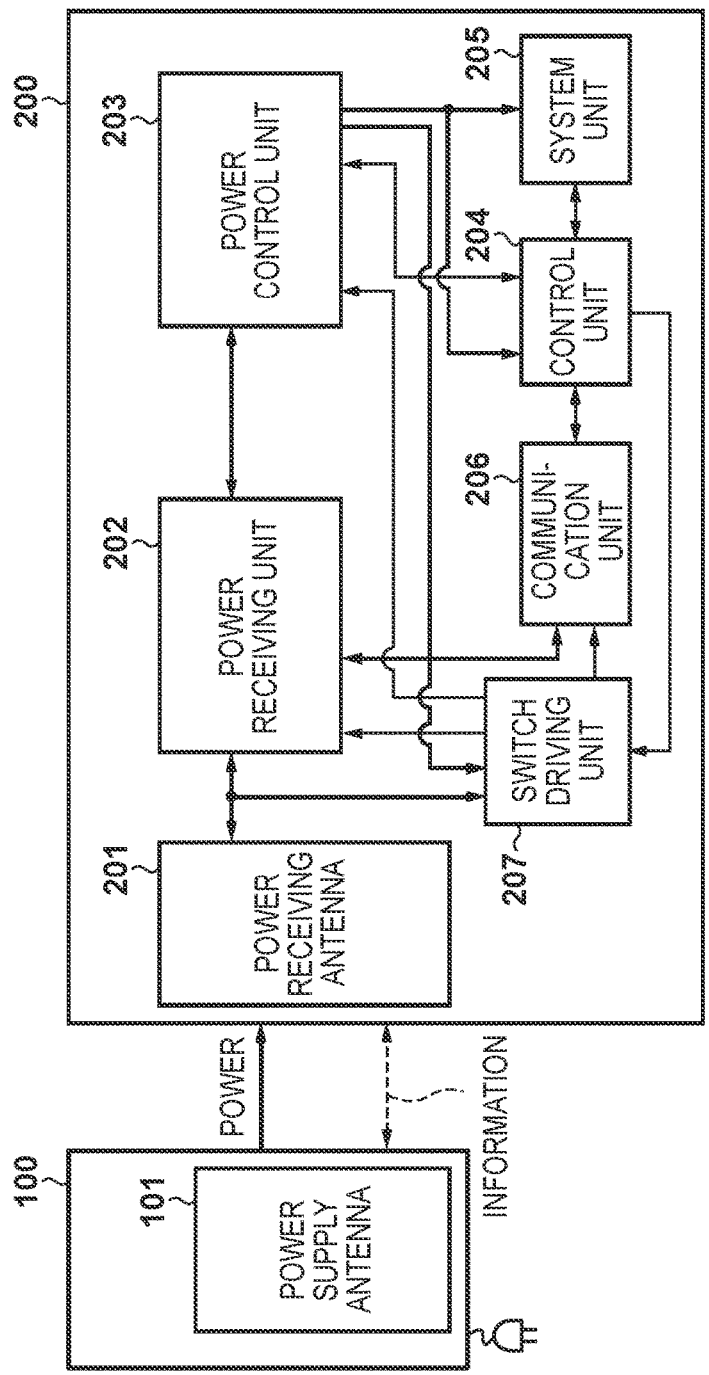
FIG. 2B is a block diagram for illustrating an example of the configuration of the wireless power supply system in the second embodiment.

FIGS. 2A and 2B are block diagrams each showing an example of a configuration of the wireless power supply system including the power supply apparatus 100 and the electronic apparatus 200.

As shown in FIGS. 2A and 2B, the power supply apparatus 100 outputs AC power generated in the power supply apparatus 100 to the power receiving antenna 201 of the electronic apparatus 200 via the power supply antenna 101.

Power generated by the power supply apparatus 100 includes the first power and the second power. The first power is power for communication for transmitting, to the electronic apparatus 200, a command for controlling the electronic apparatus 200 by the power supply apparatus 100. The second power is larger than the first power, and is power necessary to cause the electronic apparatus 200 to charge the secondary battery 404 and cause the electronic apparatus 200 to operate a system unit 205. For example, the first power is a power of 1 W or less, and the second power is a power of 1 W to 10 W.

The power supply apparatus 100 transmits a command to the electronic apparatus 200 via the power supply antenna 101, and receives a response to the command transmitted to the electronic apparatus 200 via the power supply antenna 101 and a command transmitted from the electronic apparatus 200.

Note that, in a case where the power supply apparatus 100 supplies the first power to the electronic apparatus 200, it can transmit a command to the electronic apparatus 200. However, in a case where the power supply apparatus 100 supplies the second power to the electronic apparatus 200, it cannot transmit a command to the electronic apparatus 200.

The first power is power set so that the power supply apparatus 100 can transmit a command to any apparatus other than the electronic apparatus 200.

A command transmitted by the power supply apparatus 100 is a command complying with a predetermined communication protocol. The predetermined communication protocol is a communication protocol complying with ISO/IEC 18092 standard such as RFID (Radio Frequency IDentification). Alternatively, the predetermined communication protocol may be a communication protocol complying with NFC (Near Field Communication) standard. The command transmitted by the power supply apparatus 100 is superimposed on the first power and transmitted to the electronic apparatus 200.

A pulse signal transmitted to the electronic apparatus 200 is analyzed by the electronic apparatus 200, and detected as bit data containing information of "1" and information of "0". Note that the command includes identification information for identifying a destination and a command code indicating an operation instructed by the command. Note that the power supply apparatus 100 can transmit a command to the electronic apparatus 200 by changing the identification information included in the command. The power supply apparatus 100 can also transmit a command to the electronic apparatus 200 and apparatuses other than the electronic apparatus 200 by changing the identification information included in the command.

Power output from the power supply antenna 101 is AC power. The power supply apparatus 100 resonates at a frequency f of the power output from the power supply antenna 101.

The resonance frequency f is set based on the power supply antenna 101, the resonance circuit in the power supply apparatus 100, the housing of the power supply apparatus 100, and the parasitic factor of an external circuit.

The relationship between the resonance frequency f, an inductance L, and a capacitance C is given by:

$$f = \frac{1}{2\pi\sqrt{LC}} \quad (1)$$

where L represents an inductance value of the power supply antenna 101 and an external parasitic factor, and C represents an capacitance value of a parasitic factor and the resonance circuit included in the power supply apparatus 100.

In the first and second embodiments, the following description assumes that the resonance frequency f is 13.56 MHz.

(Arrangement of Electronic Apparatus 200)

An example of an arrangement of the electronic apparatus 200 will be described with reference to FIG. 2A. Note that an example of an arrangement of the electronic apparatus 200 shown in FIG. 2B will be described in the second embodiment.

The following description will be given by exemplifying a digital still camera as the electronic apparatus 200.

The electronic apparatus 200 includes the power receiving antenna 201, a power receiving unit 202, a power control unit 203, a control unit 204, the system unit 205, a communication unit 206, and a switch driving unit 207.

The power receiving antenna 201 is an antenna for receiving power supplied from the power supply apparatus 100. The electronic apparatus 200 receives power and a command from the power supply apparatus 100 via the power receiving antenna 201. Furthermore, the electronic apparatus 200 transmits, via the power receiving antenna 201, a command for controlling the power supply apparatus 100 and a response to the command received from the power supply apparatus 100.

The power receiving unit 202 supplies the power received by the power receiving antenna 201 to one of the power control unit 203 and communication unit 206. In response to an instruction from the control unit 204, the power receiving unit 202 switches the connection destination of the power receiving antenna 201 between the power control unit 203 and the communication unit 206. The resonance frequency of the electronic apparatus 200 coincides with the resonance frequency f of the power supply apparatus 100. The power receiving unit 202 will be described later with reference to FIG. 3.

In a case where the power receiving antenna 201 and the power control unit 203 are connected by the power receiving unit 202, the power received by the power receiving antenna 201 is supplied to the power control unit 203 via the power receiving unit 202. Furthermore, the power control unit 203 charges the secondary battery 404 using the power supplied via the power receiving unit 202. The power control unit 203 supplies power to the system unit 205 using the power supplied via the power receiving unit 202. The power control unit 203 will be described later with reference to FIG. 4.

The control unit 204 can control the components which the electronic apparatus 200.

The control unit 204 is a CPU (Central Processing Unit) which operates with low power consumption. The control unit 204 operates using, for example, a power of several mW. The control unit 204 may operate using the power supplied from the secondary battery 404 or the power received by the power receiving antenna 201.

The control unit 204 may operate using, for example, part of power supplied from the power receiving antenna 201 to the communication unit 206. The control unit 204 exchanges data with the system unit 205, and transmits the data acquired from the system unit 205 to the power supply apparatus 100 by using the communication unit 206. The control unit 204 also accesses the register of the communication unit 206 to confirm whether the communication unit 206 has started communication and confirm the communication state of the communication unit 206.

The system unit 205 includes an image capture unit for generating image data from an optical image of an object, a recording unit for storing image data generated by the image capture unit, and a playback unit for playing back the image data.

The communication unit 206 wirelessly communicates with the power supply apparatus 100 via the power receiving antenna 201. A command received by the communication unit 206 is a command complying with the above-described predetermined communication protocol. A command transmitted by the communication unit 206 is a command complying with the above-described predetermined communication protocol. A response transmitted by the communication unit 206 is a command complying with the above-described predetermined communication protocol.

The communication unit 206 can also communicate with an apparatus complying with the same communication protocol as that supported by the power supply apparatus 100.

The electronic apparatus 200 has a power supply mode and communication mode as operation modes. When the electronic apparatus 200 is in the communication mode, it causes the communication unit 206 to perform wireless communication using the power output from the power supply apparatus 100. When the electronic apparatus 200 is in the power supply mode, it causes a charging control unit 403 to charge the secondary battery 404 using the power output from the power supply apparatus 100. Furthermore, when the electronic apparatus 200 is in the power supply mode, it may operate the system unit 205 using the power output from the power supply apparatus 100.

The switch driving unit 207 generates a signal to control switch units 302 and 303 (to be described later) included in the power receiving unit 202, and outputs the signal to the switch units 302 and 303. The switch units 302 and 303 are used to switch the connection destination of the power receiving antenna 201 between the communication unit 206 and the power control unit 203. Note that the switch driving unit 207 will be described later with reference to FIG. 5.

(Arrangement of Power Receiving Unit 202)

Figure 3:
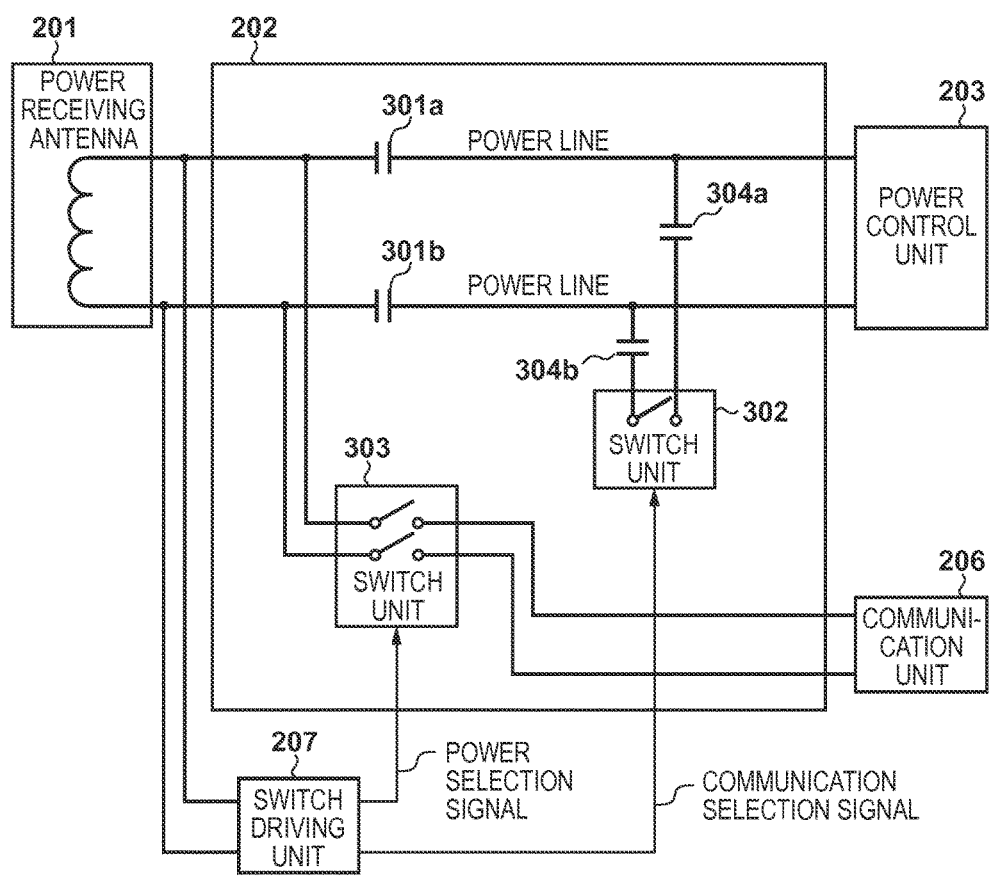
FIG. 3 is a diagram for illustrating an example of an arrangement of a power receiving unit 202 in the first and second embodiments.

The power receiving unit 202 will be described with reference to FIG. 3. FIG. 3 is a diagram for illustrating an example of an arrangement of the power receiving unit 202.

The power receiving unit 202 includes resonant elements 301a and 301b and the switch units 302 and 303. The power receiving unit 202 also includes compensating resonant elements 304a and 304b. The switch unit 302 is arranged near the power control unit 203, and the switch unit 303 is arranged near the communication unit 206.

Each of the switch units 302 and 303 is formed by, for example, one or more FETs (Field Effect Transistors) and the like. Each of the switch units 302 and 303 may be formed by a relay switch or the like other than an FET (Field Effect Transistors).

The switch units 302 and 303 are used to switch the connection destination of the power receiving antenna 201 to one of a path to the power control unit 203 and a path to the communication unit 206. The switch units 302 and 303 are used to switch connection between the power receiving antenna 201 and the resonant elements 301a and 301b. The switch units 302 and 303 are used to switch connection between the power receiving antenna 201 and the compensating resonant elements 304a and 304b. When the switch units 302 and 303 are ON (conductive), the resonant elements 301a and 301b and the compensating resonant elements 304a and 304b are connected to the power receiving antenna 201 in parallel. When the switch units 302 and 303 are OFF (non-conductive), the resonant elements 301a and 301b are connected to the power receiving antenna 201 in series.

The resonant elements 301a and 301b and the compensating resonant elements 304a and 304b are used so that the power receiving antenna 201 of the electronic apparatus 200 resonates with the power supply apparatus 100.

In a case where the power receiving antenna 201 is a coil, the resonant elements 301a and 301b are capacitors. Therefore, in the first embodiment, the following description assumes that the resonant elements 301a and 301b are capacitors. The power receiving unit 202 may further include a coil in addition to the resonant elements 301a and 301b.

Similarly, the following description assumes that the compensating resonant elements 304a and 304b are capacitors. The power receiving unit 202 may further include a coil in addition to the compensating resonant elements 304a and 304b.

FIG. 3 shows an arrangement in which the capacitance value of the resonance circuit when the electronic apparatus 200 is in the communication mode is smaller than that when the electronic apparatus 200 is in the power supply mode. The compensating resonant element 304a is a capacitor having a capacitance value smaller than that of the resonant element 301a and smaller than that of the resonant element 301b. The compensating resonant element 304b is a capacitor having a capacitance value smaller than that of the resonant element 301a and smaller than that of the resonant element 301b.

For example, the switch units 302 and 303 are connected to the switch driving unit 207, and controlled by the switch driving unit 207.

The switch unit 302 is connected between the power control unit 203 and the resonant elements 301a and 301b. The switch unit 302 is connected to the input terminals of the power control unit 203. When the switch unit 302 is turned on (rendered conductive) by the switch driving unit 207, the switch unit 302 short-circuits the power control unit 203. Therefore, when the switch unit 302 is ON (conductive), the power received by the power receiving antenna 201 is not supplied to the power control unit 203. Alternatively, when the switch unit 302 is turned off (rendered non-conductive) by the switch driving unit 207, the power receiving antenna 201 and power control unit 203 are connected to each other. When the switch unit 302 is OFF (non-conductive), the power received by the power receiving antenna 201 is supplied to the power control unit 203. The input impedance of the power control unit 203 needs to be higher than the impedance of a line to which the compensating resonant elements 304a and 304b and the switch unit 302 are connected in series. A method of setting the input impedance of the power control unit 203 higher than the impedance of the line to which the compensating resonant elements 304a and 304b and the switch unit 302 are connected in series will be described later with reference to FIG. 4.

The switch unit 303 is connected between the communication unit 206 and the power receiving antenna 201. When the switch unit 303 is turned on (rendered conductive) by the switch driving unit 207, the communication unit 206 and the power receiving antenna 201 are connected to each other. Therefore, when the switch unit 303 is ON (conductive), the power received by the power receiving antenna 201 is supplied to the communication unit 206. Alternatively, when the switch unit 303 is turned off (rendered non-conductive) by the switch driving unit 207, the connection between the communication unit 206 and the power receiving antenna 201 is disconnected. Therefore, when the switch unit 303 is OFF (non-conductive), the power received by the power receiving antenna 201 is not supplied to the communication unit 206.

When the electronic apparatus 200 is in the power supply mode, the switch units 302 and 303 are turned off (rendered non-conductive) by the switch driving unit 207. When the electronic apparatus 200 is in the communication mode, the switch units 302 and 303 are turned on (rendered conductive) by the switch driving unit 207.

While the power supply apparatus 100 outputs the second power, the switch driving unit 207 turns off the switch units 302 and 303 (renders the switch units 302 and 303 non-conductive). In this case, the switch driving unit 207 controls the switch units 302 and 303 to supply the power received by the power receiving antenna 201 to the power control unit 203.

While the power supply apparatus 100 outputs the first power, the switch driving unit 207 turns on the switch units 302 and 303 (renders the switch units 302 and 303 conductive). In this case, the switch driving unit 207 controls the switch units 302 and 303 to supply the power received by the power receiving antenna 201 to the communication unit 206. The switch driving unit 207 determines whether the power supply apparatus 100 is outputting the first power or the second power, and controls the switch units 302 and 303 in accordance with a determination result. Furthermore, the switch driving unit 207 determines whether the electronic apparatus 200 is in the communication mode or power supply mode, and controls the switch units 302 and 303 in accordance with a determination result.

Figure 6A:
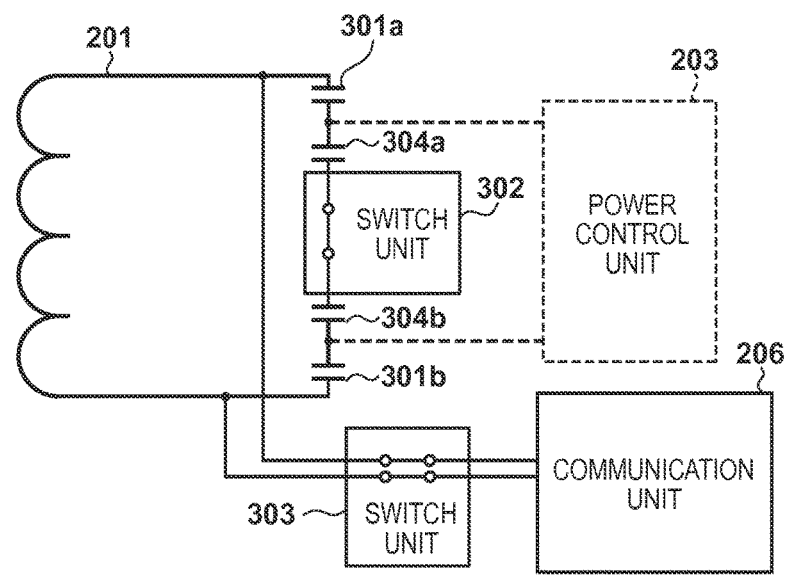
FIGS. 6A and 6B are diagrams for illustrating examples of a relationship between the power receiving antenna 201, the power control unit 203, and the communication unit 206 in the first and second embodiments.
Figure 6B:
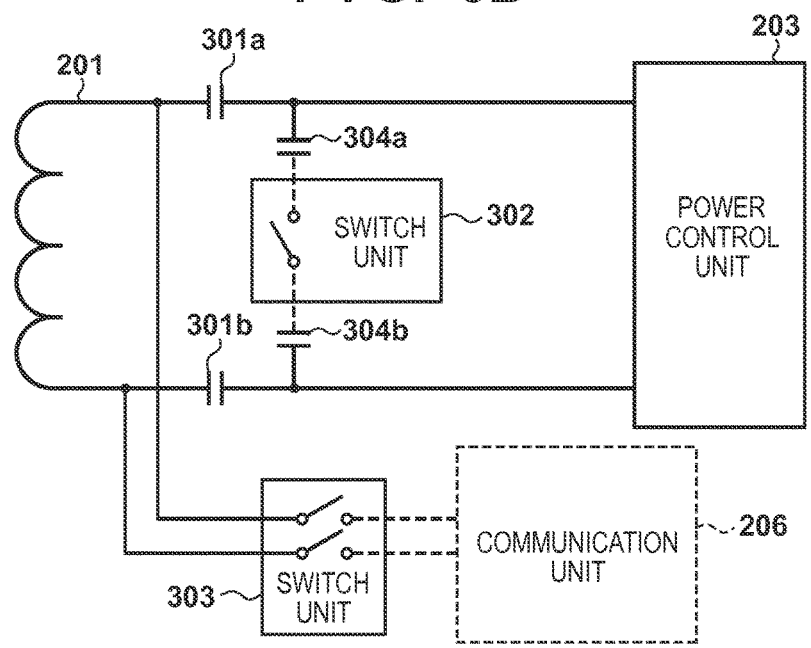

FIGS. 6A and 6B are diagrams for illustrating examples of a relationship between the power receiving antenna 201, the power control unit 203, and the communication unit 206, in a case where the electronic apparatus 200 includes the power receiving unit 202 shown in FIG. 3.

FIG. 6A is a diagram for illustrating an example of the relationship between the power receiving antenna 201, power control unit 203, and communication unit 206, when the switch units 302 and 303 are turned on (rendered conductive) by the switch driving unit 207 (when the electronic apparatus 200 is in the communication mode). When the switch units 302 and 303 are turned on (rendered conductive) by the switch driving unit 207, the resonant elements 301a and 301b and the compensating resonant elements 304a and 304b are connected in series, as shown in FIG. 6A. When the switch units 302 and 303 are turned on (rendered conductive) by the switch driving unit 207, the resonant elements 301a and 301b and the compensating resonant elements 304a and 304b are connected to the power receiving antenna 201 in parallel, as shown in FIG. 6A. Thus, the resonant elements 301a and 301b and the compensating resonant elements 304a and 304b form a parallel resonance circuit with respect to the power receiving antenna 201. In this case, the switch unit 302 short-circuits the input line of the power control unit 203. FIG. 6A is equivalent to a case in which the power control unit 203 is not connected, and thus the power control unit 203, connection between the power control unit 203 and the compensating resonant element 304a, and connection between the power control unit 203 and compensating resonant element 304b are indicated by dotted lines.

As shown in FIG. 6A, when the electronic apparatus 200 is in the communication mode, the switch units 302 and 303 are controlled to be turned on (rendered conductive) by the switch driving unit 207. Consequently, when the electronic apparatus 200 is in the communication mode, the power received by the power receiving antenna 201 is not supplied to the power control unit 203. Note that the power received by the power receiving antenna 201 is supplied to the communication unit 206.

FIG. 6B is a diagram for illustrating an example of the relationship between the power receiving antenna 201, power control unit 203, and communication unit 206, when the switch units 302 and 303 are turned off (rendered non-conductive) by the switch driving unit 207 (when the electronic apparatus 200 is in the power supply mode). When the switch units 302 and 303 are turned off (rendered non-conductive) by the switch driving unit 207, the resonant elements 301a and 301b and the compensating resonant elements 304a and 304b are not connected in series, as shown in FIG. 6B. When the switch units 302 and 303 are turned off (rendered non-conductive) by the switch driving unit 207, the resonant elements 301a and 301b are connected to the power receiving antenna 201 in series, as shown in FIG. 6B. However, the compensating resonant elements 304a and 304b are not connected to the power receiving antenna 201.

In this case, the switch unit 303 opens the input of the communication unit 206. FIG. 6B is equivalent to a case in which the communication unit 206 is not connected, and thus the communication unit 206 and the connection between the communication unit 206 and the switch unit 303 are indicated by dotted lines. Since the switch unit 302 is also turned off (rendered non-conductive), the connection between the switch unit 302 and the compensating resonant element 304a and the connection between the switch unit 302 and the compensating resonant element 304b are indicated by dotted lines.

As shown in FIG. 6B, when the electronic apparatus 200 is in the power supply mode, the switch units 302 and 303 are controlled to be turned off (rendered non-conductive) by the switch driving unit 207. In this case, since the switch unit 303 is opened, when the electronic apparatus 200 is in the power supply mode, the power received by the power receiving antenna 201 is supplied to the power control unit 203. However, the power received by the power receiving antenna 201 is not supplied to the communication unit 206. In this case, the power receiving antenna 201 and the resonant element 301a are connected in series, and the power receiving antenna 201 and the resonant element 301b are connected in series. Thus, the resonant elements 301a and 301b form a series resonance circuit with respect to the power receiving antenna 201.

As described above, by including the power receiving unit 202 shown in FIG. 3, the electronic apparatus 200 can switch the connection destination of the power receiving antenna 201 using the switch driving unit 207 depending on whether the electronic apparatus 200 is in the communication mode or the power supply mode. The switch driving unit 207 can switch the connection between the power receiving antenna 201 and the resonant elements 301a and 301b and compensating resonant elements 304a and 304b by controlling the switch units 302 and 303. This enables the switch driving unit 207 to control whether the power receiving antenna 201 is connected to the series resonance circuit or the parallel resonance circuit. In a case where the electronic apparatus 200 performs communication, the load of the electronic apparatus 200 is light (the load impedance is high), and thus the parallel resonance circuit is suitable. Therefore, when the electronic apparatus 200 is in the communication mode, the switch driving unit 207 controls the switch units 302 and 303 to connect the parallel resonance circuit to the power receiving antenna 201. Consequently, when the electronic apparatus 200 is in the communication mode, it can improve the communication sensitivity of the communication unit 206. Alternatively, in a case where the electronic apparatus 200 receives the power from the power supply apparatus 100, the load of the electronic apparatus 200 is heavy (the load impedance is low), and thus the series resonance circuit is suitable. Therefore, when the electronic apparatus 200 is in the power supply mode, the switch driving unit 207 controls the switch units 302 and 303 to connect the series resonance circuit to the power receiving antenna 201. Consequently, when the electronic apparatus 200 is in the power supply mode, it can reduce the loss of power supplied from the power supply apparatus 100, thereby improving the power supply efficiency.

(Arrangement of Power Control Unit 203)

Figure 4:
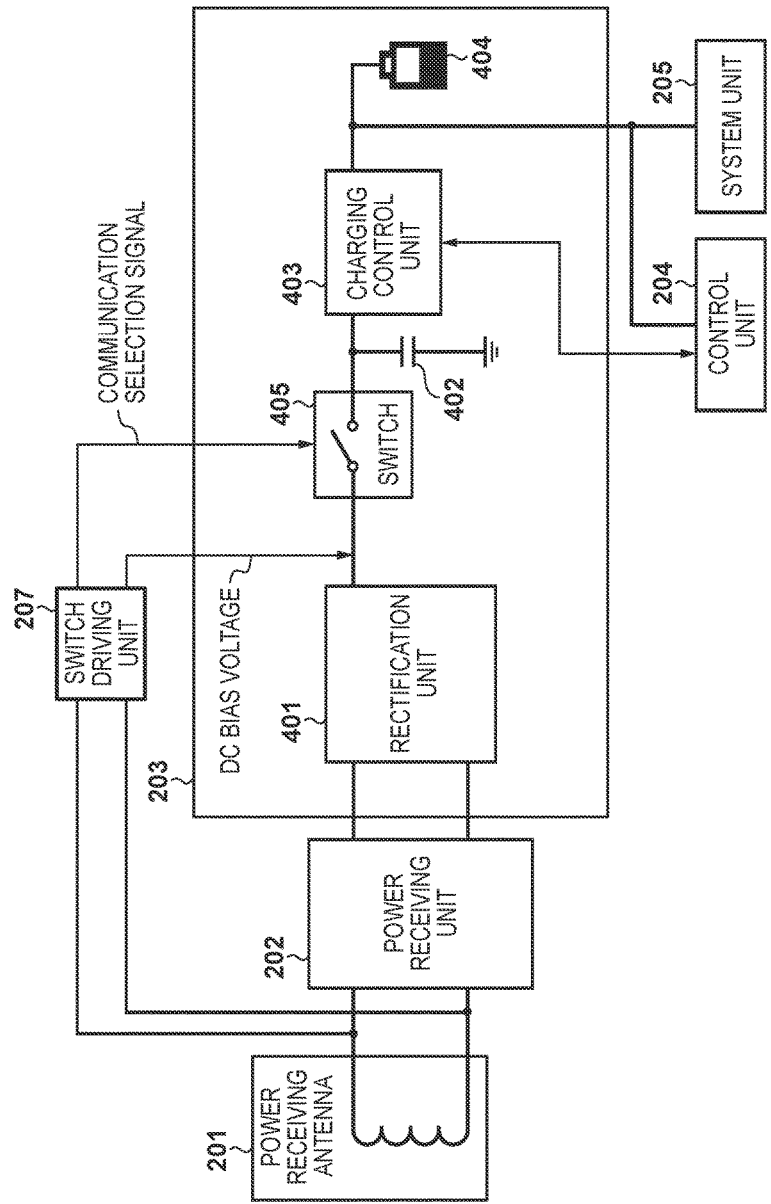
FIG. 4 is a diagram for illustrating an example of an arrangement of a power control unit 203 in the first and second embodiments.

The power control unit 203 will be described with reference to FIG. 4. FIG. 4 is a diagram showing an example of an arrangement of the power control unit 203.

The power control unit 203 includes a rectification unit 401, a smoothing capacitor 402, the charging control unit 403, the secondary battery 404, and a switch 405.

The power receiving unit 202 supplies the AC power received by the power receiving antenna 201 to the power control unit 203. As shown in FIG. 4, the switch 405 is arranged between the rectification unit 401 and the smoothing capacitor 402. Furthermore, the switch driving unit 207 applies a DC bias voltage between the rectification unit 401 and the smoothing capacitor 402.

The DC bias voltage may be applied between the rectification unit 401 and the smoothing capacitor 402 from the switch driving unit 207 via a resistor (for example, 1 KΩ). The value of the DC bias voltage applied by the switch driving unit 207 is a voltage value larger than the peak value of an AC voltage before input to the rectification unit 401.

The rectification unit 401 includes a diode. The rectification unit 401 is, for example, a full-wave rectifier circuit using four diodes. Alternatively, the rectification unit 401 may be a half-wave rectifier circuit using one diode. The rectification unit 401 smoothes the AC power supplied from the power receiving unit 202 using the smoothing capacitor 402, and converts it into DC power.

The smoothing capacitor 402 includes, for example, an electrolytic capacitor and ceramic capacitor. The capacitance of the smoothing capacitor 402 falls within, for example, a range from 22 μF to 100 μF. The DC power converted by the smoothing capacitor 402 is supplied to the charging control unit 403.

The charging control unit 403 charges the secondary battery 404 using the DC power supplied from the smoothing capacitor 402. The charging control unit 403 charges the secondary battery 404 by, for example, performing constant current/constant voltage control.

The charging control unit 403 is connected to the control unit 204, and configured to perform serial communication. The control unit 204 accesses the register of the charging control unit 403 to set the value of a charging current and the value of a charging voltage to the secondary battery 404. Furthermore, the control unit 204 acquires charge state information indicating a method of charging the secondary battery 404 by accessing the register of the charging control unit 403. The charge state information includes information indicating a trickle charge or boost charge as information indicating a method of charging the secondary battery 404.

The secondary battery 404 is a chargeable battery such as a lithium ion battery. The secondary battery 404 can supply power to the system unit 205.

The switch 405 is, for example, a P-channel FET. The switch 405 is connected to the switch driving unit 207, and the switch driving unit 207 turns on or off the switch 405 (renders the switch 405 conductive or non-conductive). The switch 405 is arranged between the rectification unit 401 and the smoothing capacitor 402. The switch 405 controls not to supply the power rectified by the rectification unit 401 to the smoothing capacitor 402 or the charging control unit 403 serving as a DC load. Thus, when the electronic apparatus 200 is in the communication mode, the switch driving unit 207 turns off the switch 405 (renders the switch 405 non-conductive) to disconnect the load such as the charging control unit 403 from the rectification unit 401. When the switch 405 is OFF (non-conductive), the rectification unit 401 is not connected to the smoothing capacitor 402, charging control unit 403, secondary battery 404, system unit 205, and control unit 204. Therefore, the power received by the power receiving antenna 201 is not supplied from the rectification unit 401 to the smoothing capacitor 402, charging control unit 403, secondary battery 404, system unit 205, and control unit 204. As a result, the DC bias voltage from the switch driving unit 207 is securely applied to the rectification unit 401.

When the electronic apparatus 200 is in the power supply mode, the switch driving unit 207 turns on the switch 405 (renders the switch 405 conductive) to supply the power from the rectification unit 401 to the load such as the charging control unit 403. When the switch 405 is ON (conductive), the rectification unit 401 is connected to the smoothing capacitor 402, charging control unit 403, secondary battery 404, system unit 205, and control unit 204. Therefore, the power received by the power receiving antenna 201 is supplied from the rectification unit 401 to the smoothing capacitor 402, charging control unit 403, secondary battery 404, system unit 205, and control unit 204.

In accordance with a timing at which the electronic apparatus 200 is in the communication mode, the switch driving unit 207 turns off the switch 405 (renders the switch 405 non-conductive). This supplies a DC bias signal as a DC bias voltage to the switch 405, and applies an inverse DC bias voltage to the diode of the rectification unit 401, thereby increasing the input impedance of the power control unit 203.

With the above arrangement, even if the electronic apparatus 200 includes the power receiving unit 202 shown in FIG. 3, it is possible to set the input impedance of the power control unit 203 higher than the impedance of the line to which the compensating resonant elements 304a and 304b and the switch unit 302 are connected in series.

(Arrangement of Switch Driving Unit 207)

An example of an arrangement of the switch driving unit 207 will be described with reference to FIG. 5.

The switch driving unit 207 includes impedance conversion elements 501a and 501b, smoothing capacitors 502a and 502b, rectifier diodes 503a and 503b, and voltage dividing resistors 504a and 504b. The switch driving unit 207 also includes a resistor 505, a voltage detection IC 506, a Zener diode 507, an FET 508, and a resistor 509.

Figure 5:
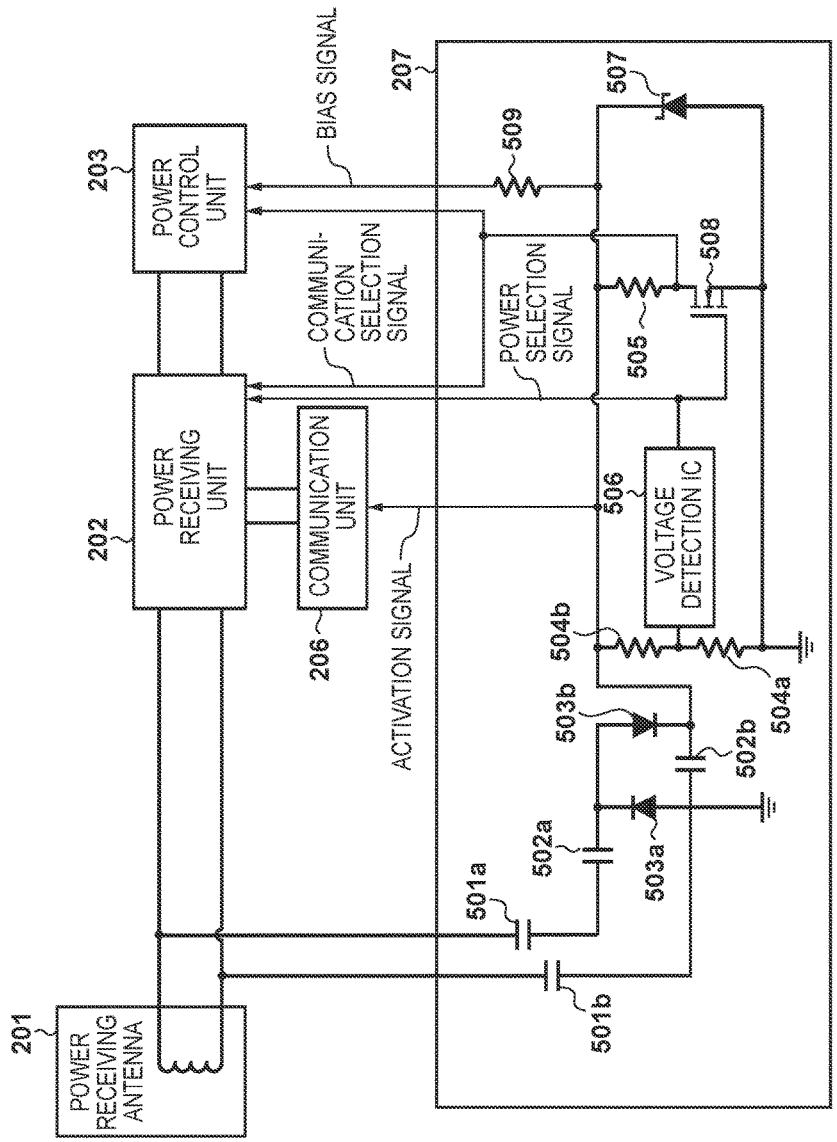
FIG. 5 is a diagram for illustrating an example of an arrangement of a switch driving unit 207 in the first embodiment.

The impedance conversion element 501a is a capacitor in FIG. 5 but may be a coil or resistor. Furthermore, the impedance conversion element 501b is a capacitor in FIG. 5 but may be a coil or resistor. Note that a case in which the impedance conversion elements 501a and 501b are capacitors will be explained below.

The impedance conversion element 501a is connected to the power receiving antenna 201, and the impedance conversion element 501b is connected to the power receiving antenna 201. Since the impedance is increased with respect to an AC amplitude supplied from the power receiving antenna 201, the capacitance value of the impedance conversion element 501a and that of the impedance conversion element 501b become small. The capacitance value of the impedance conversion element 501a is set so that the impedance on the power side viewed from the end portion of the power receiving antenna 201 in the power supply mode is higher than that on the communication side viewed from the end portion of the power receiving antenna 201 in the communication mode.

The capacitance value of the impedance conversion element 501a is set to be higher than the impedance on the power side viewed from the end portion of the power receiving antenna 201 in the power supply mode. Furthermore, the capacitance value of the impedance conversion element 501a is set to be higher than the impedance on the communication side viewed from the end portion of the power receiving antenna 201 in the communication mode. The capacitance value of the impedance conversion element 501b is set to be higher than the impedance on the power side viewed from the end portion of the power receiving antenna 201 in the power supply mode. Furthermore, the capacitance value of the impedance conversion element 501b is set to be higher than the impedance on the communication side viewed from the end portion of the power receiving antenna 201 in the communication mode. The power side viewed from the end portion of the power receiving antenna 201 indicates the side of the resonant elements 301a and 301b, and the communication side viewed from the end portion of the power receiving antenna 201 indicates the side of the switch unit 303. The capacitance value of the impedance conversion element 501a and that of the impedance conversion element 501b are, for example, about 10 pF. The power received by the power receiving antenna 201 is not supplied to the switch driving unit 207 so much. In this case, the power received by the power receiving antenna 201 is supplied to the switch unit 303 when the electronic apparatus 200 is in the communication mode, and supplied to the resonant elements 301a and 301b when the electronic apparatus 200 is in the power supply mode.

Therefore, even if the switch driving unit 207 is connected to the power receiving antenna 201, it is possible to prevent an influence on the resonance circuit and resonance frequency of the electronic apparatus 200. This reduces the influence of the switch driving unit 207 on the resonance of the power supply apparatus 100 and electronic apparatus 200, thereby preventing a decrease in power supply efficiency and a decrease in communication sensitivity which are caused by the influence on the resonance of the power supply apparatus 100 and electronic apparatus 200.

The smoothing capacitor 502a has a capacitance value larger than that of the impedance conversion element 501a and larger than that of the impedance conversion element 501b.

The smoothing capacitor 502b has a capacitance value larger than that of the impedance conversion element 501a and larger than that of the impedance conversion element 501b.

The rectifier diodes 503a and 503b are, for example, Schottky barrier diodes or the like. The rectifier diodes 503a and 503b need not cause a large current to flow, and thus are not diodes for causing a large current to flow, which are used in the rectification unit 401, but diodes having a small rated current value.

The impedance conversion elements 501a and 501b supply most of the power received by the power receiving antenna 201 to the communication unit 206 or the power control unit 203. In this case, only a small part of the power received from the power receiving antenna 201 is supplied to the switch driving unit 207. Since the input voltage from the power receiving antenna 201 decreases via the impedance conversion elements 501a and 501b, the switch driving unit 207 cannot output a voltage for driving the switch units 302 and 303 and the switch 405 in some cases.

To solve this problem, the switch driving unit 207 uses the smoothing capacitors 502a and 502b and the rectifier diodes 503a and 503b as a rectifier circuit for raising the input voltage input from the power receiving antenna 201 and outputting it. The input voltage is doubled and output by a rectification smoothing circuit formed by the smoothing capacitors 502a and 502b and the rectifier diodes 503a and 503b.

Note that the switch driving unit 207 need only include a circuit capable of outputting a voltage for driving the switch units 302 and 303 and the switch 405 based on the input voltage input from the power receiving antenna 201. Thus, if the input voltage from the power receiving antenna 201 is enough to drive the switch units 302 and 303 and the switch 405, the switch driving unit 207 may use another circuit. In this case, the switch driving unit 207 may use a half-wave rectifier circuit using one diode instead of the smoothing capacitors 502*a* and 502*b* and the rectifier diodes 503*a* and 503*b*.

Even if the input voltage from the power receiving antenna 201 is not enough to drive the switch units 302 and 303 and the switch 405, the switch driving unit 207 may use another circuit. In this case, the switch driving unit 207 may output the input voltage as a four-fold voltage by providing two stages of rectification smoothing circuits each formed by the smoothing capacitors 502*a* and 502*b* and rectifier diodes 503*a* and 503*b*.

The voltage dividing resistors 504*a* and 504*b* are connected in series between GND and an output from the rectification smoothing circuit formed by the smoothing capacitors 502*a* and 502*b* and rectifier diodes 503*a* and 503*b*. The voltage dividing resistors 504*a* and 504*b* have impedance values so that the voltage value of the voltage dividing resistor 504*a* is adjusted to a proper value. The voltage of the voltage dividing resistor 504*a* is the potential difference between GND and the point of contact of the voltage dividing resistor 504*a* and voltage detection IC 506.

The voltage of the voltage dividing resistor 504*a* is detected by the voltage detection IC 506.

The impedance values of the voltage dividing resistors 504*a* and 504*b* are set so that the voltage of the voltage dividing resistor 504*a* exceeds a predetermined value (for example, 1.5 V) as the threshold of the voltage detection IC 506 when the electronic apparatus 200 is in the power supply mode. Furthermore, the impedance values of the voltage dividing resistors 504*a* and 504*b* are set so that the voltage of the voltage dividing resistor 504*a* does not exceeds the predetermined value when the electronic apparatus 200 is in the communication mode. The voltage of the voltage dividing resistor 504*a* will be referred to as a "switching detection voltage" hereinafter.

The voltage detection IC 506 is an IC for detecting whether the switching detection voltage has exceeded the predetermined value (thus, the voltage detection IC will also be referred to as a voltage detection unit hereinafter). The output of the voltage detection IC 506 may be an open drain output. The predetermined value has a hysteresis characteristic for preventing a detection error.

The resistor 505 is a pull-up resistor connected in series between the FET 508 and the output from the rectification smoothing circuit formed by the smoothing capacitors 502*a* and 502*b* and rectifier diodes 503*a* and 503*b*. Since the resistor 505 need not cause a large current to flow, the impedance value of the resistor 505 need only be set to, for example, 100 kΩ or more.

The Zener diode 507 is used to suppress an excess increase in output voltage from the rectification smoothing circuit formed by the smoothing capacitors 502*a* and 502*b* and rectifier diodes 503*a* and 503*b*. When the gate breakdown voltage of the FET 508 is 10 V, a Zener diode in which the Zener effect occurs at 9 V is used as the Zener diode 507.

The FET 508 is an FET used to match high or low logic when controlling the switch units 302 and 303 and the switch 405. The FET 508 is, for example, an N-channel FET. Since the switch driving unit 207 has a high impedance input, no large power is supplied from the power receiving antenna 201, and thus it is desirable to use an FET driven by a voltage for logic matching. If logic matching is unnecessary, neither the resistor 505 nor the FET 508 needs to be provided.

The voltage detection IC 506 and the power receiving unit 202 are connected to each other, and a power selection signal is supplied to the switch unit 303 as an output from the voltage detection IC. In a case where the power selection signal of high level is supplied to the switch unit 303, the switch unit 303 is turned off (rendered non-conductive). In a case where the power selection signal of low level is supplied to the switch unit 303, the switch unit 303 is turned on (rendered conductive).

Furthermore, since the FET 508 and the power receiving unit 202 are connected to each other, and the FET 508 and the power control unit 203 are connected to each other, a communication selection signal is output to the switch unit 302 and switch 405 as an output from the drain of the FET 508.

In a case where the communication selection signal of high level is supplied to the switch unit 302, the switch unit 302 is turned on (rendered conductive). In a case where the communication selection signal of low level is supplied to the switch unit 302, the switch unit 302 is turned off (rendered non-conductive). In a case where the communication selection signal of high level is supplied to the switch 405, the switch 405 is turned off (rendered non-conductive). In a case where the communication selection signal of low level is supplied to the switch 405, the switch 405 is turned on (rendered conductive).

The power control unit 203 and the output from the rectification smoothing circuit formed by the smoothing capacitors 502*a* and 502*b* and rectifier diodes 503*a* and 503*b* are connected via the resistor 509. The output from the rectification smoothing circuit formed by the smoothing capacitors 502*a* and 502*b* and rectifier diodes 503*a* and 503*b* is applied to the power control unit 203 as a DC bias signal.

The communication unit 206 and the output from the rectification smoothing circuit formed by the smoothing capacitors 502*a* and 502*b* and rectifier diodes 503*a* and 503*b* are connected to each other. The output from the rectification smoothing circuit formed by the smoothing capacitors 502*a* and 502*b* and rectifier diodes 503*a* and 503*b* is applied to the communication unit 206 as an activation signal. This is because when the electronic apparatus 200 performs communication, in a case where the power receiving unit 202 further supplies power other than carrier power to the communication unit 206, the communication sensitivity of the communication unit 206 may be improved depending on an arrangement of the communication unit 206.

The power selection signal and communication selection signal are output in accordance with outputs from the smoothing capacitors 502*a* and 502*b* and rectifier diodes 503*a* and 503*b*. However, another rectification smoothing circuit and another impedance conversion element may be connected to the power receiving antenna 201 to output a DC bias signal to the power control unit 203.

As described above, in a case where the electronic apparatus 200 includes the switch driving unit 207 shown in FIG. 5, even if the remaining capacity of the secondary battery 404 is 0, it is possible to control the switch units 302 and 303 with the power received by the power receiving antenna 201 from the power supply apparatus 100.

Furthermore, by using the switch driving unit 207 shown in FIG. 5, the electronic apparatus 200 can prevent the influence on the resonance circuit and resonance frequency of the electronic apparatus 200.

(Voltage Waveforms at Time of Switching Operation)

The voltages of the respective components when switching the operation mode of the electronic apparatus 200 to the communication mode or power supply mode will be described with reference to FIG. 7.

FIG. 7 shows the voltage of the end of the power receiving antenna 201, the switching detection voltage, the voltage of the power selection signal output from the voltage detection IC 506, the voltage of the communication selection signal output from the drain of the FET 508, and the input voltage of the communication unit 206.

As shown in FIG. 7, the waveform of the voltage of the end of the power receiving antenna 201 is small when the electronic apparatus 200 is in the communication mode (during communication in FIG. 7), and is large when the electronic apparatus 200 is in the power supply mode (during power supply in FIG. 7).

To perform communication for notifying the power supply apparatus 100 of the state of the electronic apparatus 200 and the state of the secondary battery 404, the electronic apparatus 200 needs to be periodically set in the communication mode. To do this, the electronic apparatus 200 alternately switches its operation mode between the communication mode and the power supply mode until wireless power supply from the power supply apparatus 100 ends.

As shown in FIG. 7, the waveform of the switching detection voltage changes according to the voltage of the end of the power receiving antenna 201. If the waveform of the switching detection voltage is equal to or larger than a threshold corresponding to a voltage level A, the communication selection signal is set at high level. In this case, the power selection signal is at low level. The switch units 302 and 303 are turned on (rendered conductive) and the switch 405 is turned off (rendered non-conductive). Before the waveform of the switching detection voltage becomes equal to or larger than the threshold corresponding to the voltage level A, neither the switch unit 302 nor the switch unit 303 is turned on (rendered conductive).

If the waveform of the switching detection voltage is equal to or larger than a threshold corresponding to a voltage level C, the communication selection signal is set at low level and the power selection signal is set at high level. In this case, the switch units 302 and 303 are turned off (rendered non-conductive) and the switch 405 is turned on (rendered conductive). The threshold corresponding to the voltage level C is the predetermined value used by the voltage detection IC 506. Since the predetermined value of the voltage detection IC 506 has the hysteresis characteristic, if the switching detection voltage rises, the predetermined voltage is set as the threshold corresponding to the voltage level C.

If the waveform of the switching detection voltage becomes smaller than a threshold corresponding to a voltage level B after it becomes equal to or larger than the threshold corresponding to the voltage level C, the communication selection signal is set at high level and the power selection signal is set at low level. In this case, the switch units 302 and 303 are turned on (rendered conductive) and the switch 405 is turned off (rendered non-conductive). The threshold corresponding to the voltage level B is the predetermined value used by the voltage detection IC 506. In a case where the switching detection voltage lowers, the predetermined value of the voltage detection IC 506 is set as the threshold corresponding to the voltage level B.

As shown in FIG. 7, the waveform of the input voltage of the communication unit 206 is large when the electronic apparatus 200 is in the communication mode (during communication in FIG. 7), and is small when the electronic apparatus 200 is in the power supply mode (during power supply in FIG. 7). This is because when the electronic apparatus 200 is in the power supply mode (during power supply in FIG. 7), the switch unit 303 is turned off (rendered non-conductive) to control not to connect the power receiving antenna 201 and the communication unit 206. However, the reason why the amplitude of the waveform of the input voltage of the communication unit 206 is not zero is that even if the switch unit 303 is OFF (non-conductive), a voltage which has leaked is supplied to the communication unit 206.

In addition, even if the power supply apparatus 100 outputs large power due to an error or the like, the electronic apparatus 200 can control not to supply excess power to the communication unit 206 in accordance with a rise in switching detection voltage.

As described above, even if the remaining capacity of the secondary battery 404 is 0, the electronic apparatus 200 can switch the electronic apparatus 200 between the power supply mode and the communication mode by using the power received by the power receiving antenna 201 from the power supply apparatus 100. This enables the electronic apparatus 200 to prevent the second power from being supplied to the communication unit 206 even if the power supply apparatus 100 outputs the second power, thereby protecting the communication unit 206. In addition, even if the power supply apparatus 100 outputs the first power, the electronic apparatus 200 can prevent the first power from being supplied to the power control unit 203.

The electronic apparatus 200 can also prevent the influence on the resonance circuit and resonance frequency of the electronic apparatus 200 by using the switch driving unit 207 shown in FIG. 5. Consequently, even if the switch driving unit 207 is used, the influence on the resonance of the power supply apparatus 100 and electronic apparatus 200 reduces, and thus the electronic apparatus 200 can prevent a decrease in power supply efficiency and a decrease in communication sensitivity which are caused by the influence on the resonance of the power supply apparatus 100 and electronic apparatus 200.

Furthermore, in the electronic apparatus 200, the capacitance values of the impedance conversion elements 501*a* and 501*b* are set as in the first embodiment. This can make the impedance of the switch driving unit 207 higher than that on the power side viewed from the end portion of the power receiving antenna 201 in the power supply mode. It is also possible to make the impedance of the switch driving unit 207 higher than that on the communication side viewed from the end portion of the power receiving antenna 201 in the communication mode. Note that when the switch unit 302 is ON (conductive), the impedance of the switch driving unit 207 is lower than that on the power side viewed from the end portion of the power receiving antenna 201. When the switch unit 303 is OFF (non-conductive), the impedance of the switch driving unit 207 is lower than that on the communication side viewed from the end portion of the power receiving antenna 201.

Second Embodiment

In the first embodiment, the switch driving unit 207 controls the switch units 302 and 303 and switch 405 using the power supplied from the power receiving antenna 201. In the second embodiment, a case in which a switch driving unit 207 controls switch units 302 and 303 and a switch 405 using power supplied from a secondary battery 404 will be described.

Figure 8:
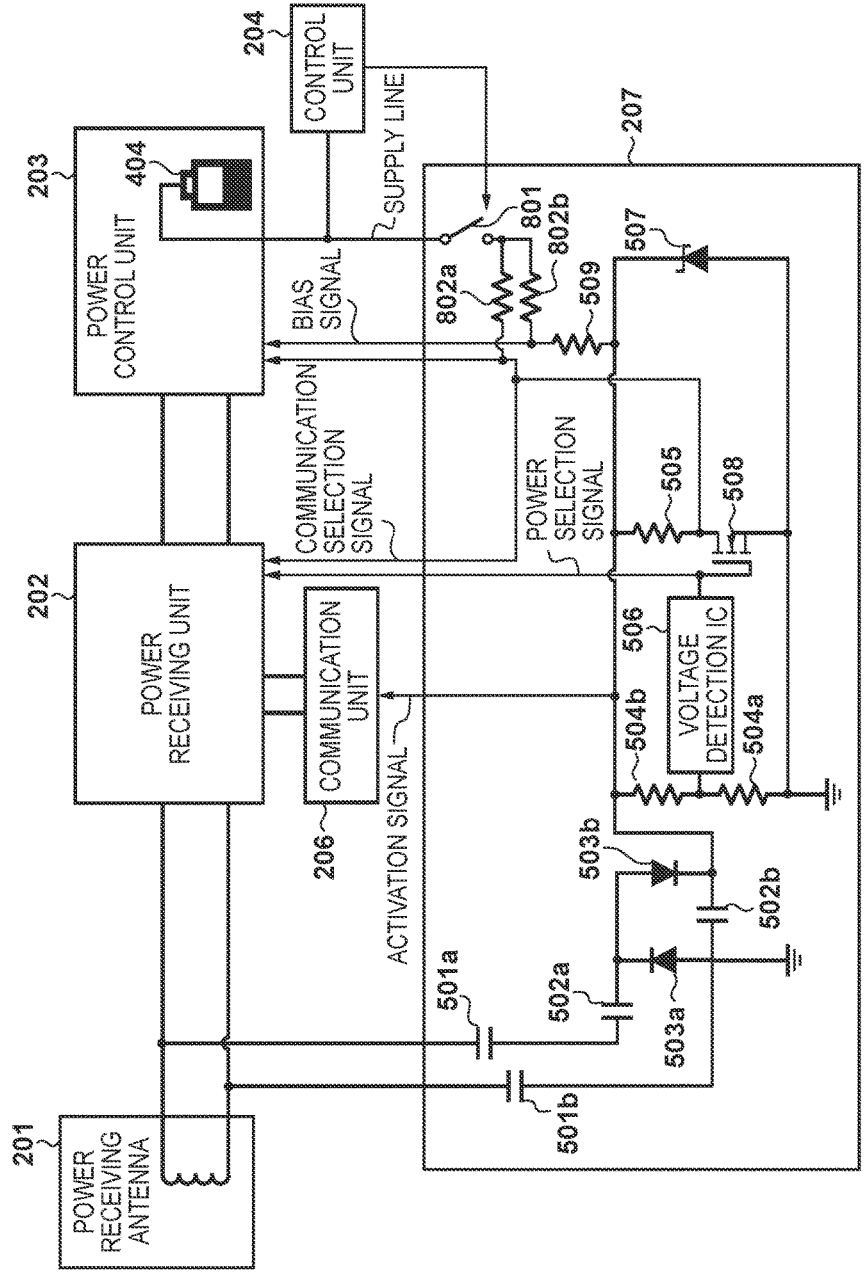
FIG. 8 is a diagram for illustrating an example of an arrangement of the switch driving unit 207 in the second embodiment.

FIG. 2B shows an example of an arrangement of the electronic apparatus 200 in the second embodiment. FIG. 8 shows an example of the switch driving unit 207 in the second embodiment. A description of components and functions common to the first embodiment will be omitted.

Unlike FIG. 2A, in FIG. 2B, a connection line of a power control unit 203 and the switch driving unit 207 is added and a connection line of the switch driving unit 207 and a control unit 204 is added.

The connection line of the switch driving unit 207 and power control unit 203 is a supply line indicating power supply from the secondary battery 404 to the switch driving unit 207. The connection line of the switch driving unit 207 and control unit 204 is a signal line for permitting power supply from the secondary battery 404 to the switch driving unit 207 by the control unit 204 which is receiving power supply from the secondary battery 404.

An example of an arrangement of the switch driving unit 207 in the second embodiment will be described with reference to FIG. 8.

Referring to FIG. 8, the switch driving unit 207 includes a switch 801 for connecting the supply line connected to the secondary battery 404. Furthermore, the switch driving unit 207 includes a resistor 802a arranged between the switch 801 and the drain of an FET 508, and a resistor 802b arranged between the switch 801 and a resistor 509.

When the switch 801 is turned on (rendered conductive), the supply line connected to the secondary battery 404 is connected to a line for outputting a DC bias signal to the power control unit 203 via the resistor 802b. In this case, in accordance with the power supplied from the secondary battery 404, the DC bias signal is supplied to the power control unit 203. Furthermore, when the switch 801 is turned on (rendered conductive), the supply line of the secondary battery 404 is connected to a line for outputting a communication selection signal via the resistor 802a. In this case, in accordance with the power supplied from the secondary battery 404, the communication selection signal of high level or low level is output.

By including the switch driving unit 207 shown in FIG. 8, the electronic apparatus 200 can use the power accumulated in the secondary battery 404 for the operation of the switch driving unit 207.

Note that when the remaining capacity of the secondary battery 404 is equal to or larger than a predetermined remaining capacity, the control unit 204 turns on the switch 801 (renders the switch 801 conductive) using the power supplied from the secondary battery 404. With this operation, the supply line connected to the secondary battery 404 is connected to the resistors 802a and 802b, and thus the power is supplied from the secondary battery 404 to the switch driving unit 207.

To prevent back-flow, the switch 801 is desirably formed by two FETs or a diode and FET.

The switch 801 may be a diode. In this case, when the remaining capacity of the secondary battery 404 is equal to or larger than the predetermined remaining capacity, the power is supplied from the secondary battery 404 to the switch driving unit 207 without controlling to turn on the switch 801 (render the switch 801 conductive) by the control unit 204.

The resistors 802a and 802b are pull-up resistors. The resistors 802a and 802b pull up the signal line with the voltage of the secondary battery 404. With this operation, even if a power receiving antenna 201 supplies no power to the switch driving unit 207, when the remaining capacity of the secondary battery 404 is equal to or larger than the predetermined remaining capacity, power is supplied to the switch driving unit 207 via the switch 801. Furthermore, the supply line of the secondary battery 404 may be connected to a line for outputting an activation signal. The supply line connected to the secondary battery 404 may be connected to a line for outputting a power selection signal. Therefore, the switch driving unit 207 can control the switch units 302 and 303 and the switch 405 using the power supplied from the secondary battery 404.

Another example of the arrangement of the switch driving unit 207 in the second embodiment will be described with reference to FIG. 9. In the example shown in FIG. 9, in a case where the remaining capacity of the secondary battery 404 is sufficient, the control unit 204 switches between a communication mode and a power receiving mode regardless of the voltage level of the power receiving antenna 201.

Figure 9:
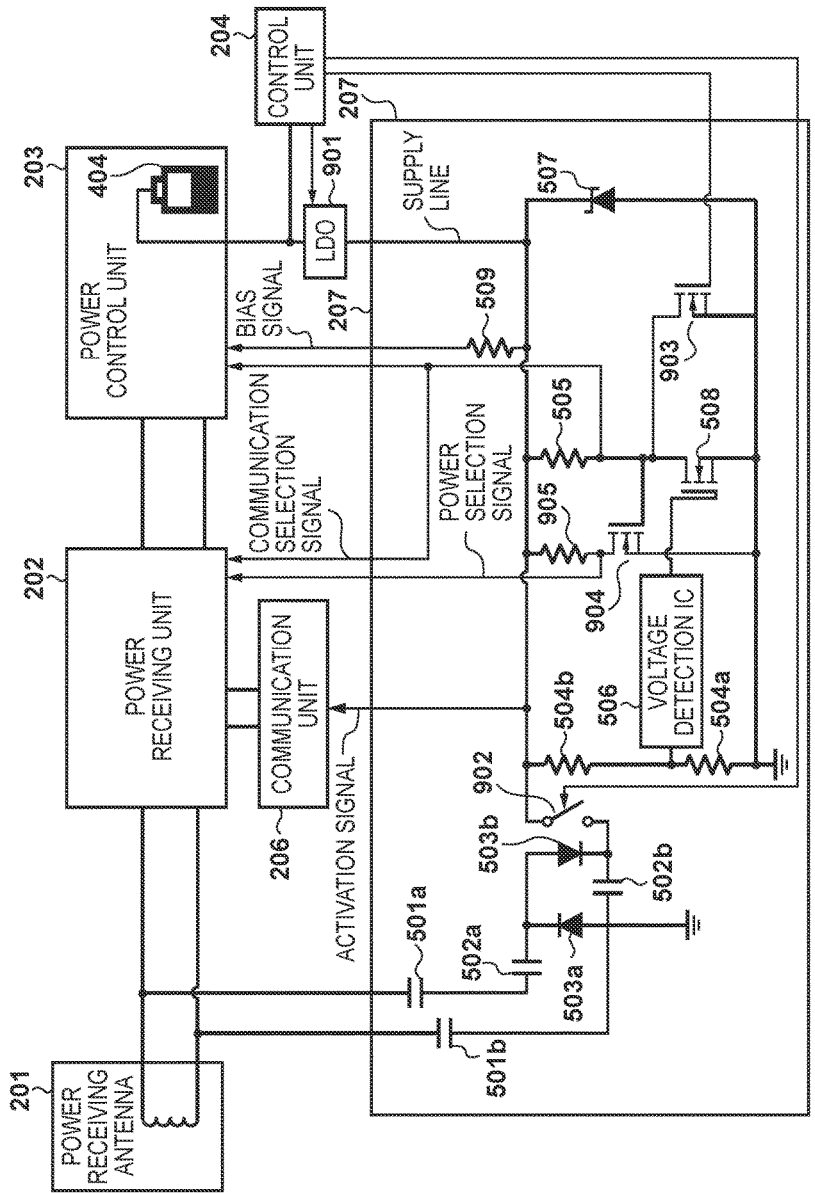
FIG. 9 is a diagram for illustrating another example of the arrangement of the switch driving unit 207 in the second embodiment.

Referring to FIG. 9, the switch driving unit 207 includes a supply line as an output from an LDO (Low Drop Out) connected to the secondary battery 404. The switch driving unit 207 also includes a switch 902, FETs 903 and 904, and a resistor 905 arranged between the drain of the FET 904 and the supply line.

The LDO 901 is a series regulator connected to the secondary battery 404, and sets power supplied from the secondary battery 404 at a predetermined voltage level, and supplies the power to the switch driving unit 207 through the supply line. The predetermined voltage level to be supplied is a power level at which voltage levels divided by resistors 504a and 504b are lower than a threshold voltage detected by a voltage detection IC 506 and the switch units 302, 303 and the switch 405 can be turned on. This is to set an output from the voltage detection IC 506 at low level to turn off the FET 508 (renders the FET 508 non-conductive), thereby enabling the control unit 204 to control the switch driving unit 207.

The LDO 901 is also connected to the control unit 204. If the voltage level of the secondary battery 404 is lower than a predetermined value, the control unit 204 controls to stop the output from the LDO 901. In this case, the predetermined value is, for example, 3.3 V or the like.

One end of the switch 902 is connected to the smoothing capacitor 502b and the rectifier diode 503a, and the other end of the switch 902 is connected to the supply line. The switch 902 is also connected to the control unit 204, and controlled to be turned on or off by a control signal of the control unit 204. If it is determined that the remaining capacity of the secondary battery 404 is equal to or larger than a predetermined remaining capacity, the control unit 204 controls to output power from the LDO 901, and turns off the switch 902. This allows the control unit 204 to control the switch driving unit 207 regardless of the power level from the power receiving antenna 201. If it is determined that the remaining capacity of the secondary battery 404 is smaller than the predetermined remaining capacity, the control unit 204 stops the output power from the LDO 901, and turns on the switch 902. With this processing, the switch driving unit 207 operates at the power level from the power receiving antenna 201. The switch 902 is a normally-on switch, and is turned on even if there is no remaining capacity of the secondary battery 404 and the control unit 204 cannot operate.

The drain terminal of the FET 903 is connected to that of the FET 508, thereby forming a wired-OR arrangement. The drain terminal of the FET 903 is connected, as a communication selection signal, to the power receiving unit 202 and power control unit 203. The FET 903 is also connected to the control unit 204, and controlled to be turned on or off by the control unit 204. In a case where the control unit 204 outputs a control signal of high level, the voltage of the drain terminal of the FET 903 is at low level, and thus the communication selection signal is at low level. In a case where the control unit 204 outputs a control signal of low level, the voltage of the drain terminal of the FET 903 is at high level, and thus the communication selection signal is at high level.

The drain terminal of the FET 904 is connected to the supply line via the resistor 905. The drain terminal of the FET 904 is also connected, as a power selection signal, to the power receiving unit. The gate of the FET 904 is connected to the drain of the FET 903. Therefore, in a case where the control unit 204 outputs a control signal of high level, the voltage of the drain terminal of the FET 904 is at high level, and thus the power selection signal is at high level. In a case where the control unit 204 outputs a control signal of low level, the voltage of the drain terminal of the FET 904 is at low level, and thus the power selection signal is also at low level.

The resistor 905 is arranged between the drain terminal of the FET 904 and the supply line, and functions as a pull-up resistor.

With the arrangement shown in FIG. 9, if the remaining capacity of the secondary battery 404 is sufficient, the control unit 204 can switch the electronic apparatus 200 between the communication mode and the power receiving mode regardless of the voltage level of the power receiving antenna 201.

As described above, the electronic apparatus 200 in the second embodiment supplies, to the switch driving unit 207, the power supplied from the secondary battery 404 when the remaining capacity of the secondary battery 404 is equal to or larger than the predetermined remaining capacity. Since this enables the switch driving unit 207 to control the switch units 302 and 303 and the switch 405, even if the power receiving antenna 201 supplies no power, it is possible to set the electronic apparatus 200 in the power supply mode or communication mode. In the second embodiment, when the remaining capacity of the secondary battery 404 is smaller than the predetermined remaining capacity, the switch driving unit 207 in the second embodiment performs the same operation as that in the first embodiment.

In the second embodiment, assume that the components and functions common to the first embodiment have the same effects as in the first embodiment.

Note that the first and second embodiments assume that the resonance frequency f is 13.56 MHz. However, the resonance frequency f may be a commercial frequency of 50/60 Hz, a frequency of 6.78 MHz, or a frequency of 100 kHz to 250 kHz.

Third Embodiment

At least one of the various functions, processes, and methods described in the first and second embodiments can be achieved using a program. Hereinafter, in a third embodiment, a program for realizing at least one of the various functions, processes, and methods described in the first and second embodiments will be referred to as a "program X". Furthermore, in the third embodiment, a computer for executing the program X will be referred to as a "computer Y". Examples of the computer Y include a personal computer, a microcomputer, and a central processing unit (CPU).

At least one of the various functions, processes, and methods described in the first and second embodiments can be realized by the computer Y executing the program X. In this case, the program X is supplied to the computer Y via a computer readable storage medium. A computer readable storage medium in the third embodiment includes at least one of a hard disk device, a magnetic storage device, an optical storage device, a magneto-optical storage device, a memory card, a read only memory (ROM), and a random access memory (RAM). Furthermore, the computer readable storage medium in the third embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-193070, filed Sep. 22, 2014 and Japanese Patent Application No. 2015-077212, filed Apr. 3, 2015, which are hereby incorporated by reference herein in their entireties.

What is claimed is:

1. An electronic apparatus comprising:
an antenna that wirelessly receives power;
a power control unit that accumulates or supplies power received by the antenna;
a communication unit that communicates with a power supply apparatus via the antenna;
a switching unit that selectively activates one of a path from the antenna to the power control unit and a path from the antenna to the communication unit; and
a driving unit that drives the switching unit,
wherein the driving unit is connected to the antenna via a conversion element that converts an impedance,
wherein the driving unit includes:
a rectifier circuit connected to the conversion element; and
a voltage detection unit that detects a voltage value after rectification by the rectifier circuit,
wherein the driving unit conducts a second switch connected to an input of the power control unit in a case where the voltage detected by the voltage detection unit exceeds a second threshold larger than a first threshold, and the driving unit outputs a signal to conduct a first switch connected to an input of the communication unit in a case where the voltage detected by the voltage detection falls within a range from the first threshold to the second threshold.

2. The electronic apparatus according to claim 1, wherein the second threshold has a hysteresis characteristic, and is changed depending on whether the detected voltage rises or lowers across the second threshold.

3. The electronic apparatus according to claim 1, wherein an input impedance in a case where the signal received by the antenna is input to the driving unit is lower than an input impedance in a case where the signal received by the antenna is input to the communication unit in a case where the first switch viewed from the antenna is non-conductive or the input impedance in a case where the signal received by the antenna input to the power control unit in a case where the second switch viewed from the antenna is non-conductive.

4. The electronic apparatus according to claim 1, wherein the driving unit includes the conversion element, and the conversion element increases an impedance with respect to an AC amplitude input from the antenna.

5. The electronic apparatus according to claim 4, wherein the rectifier circuit includes a circuit that rectifies an input voltage to a voltage higher than the input voltage.

6. The electronic apparatus according to claim 4, wherein the conversion element includes one of a capacitor, a coil, and a resistor.

7. The electronic apparatus according to claim 1, further comprising:
   a power supply unit that supplies power in addition to power received by the antenna,
   wherein the driving unit operates with power supplied from the power supply unit.

8. The electronic apparatus according to claim 1, wherein the driving unit outputs, to the communication unit, power different from power input by the communication unit from the antenna.

9. The electronic apparatus according to claim 1, further comprising:
   a resonance circuit with respect to the antenna,
   wherein an arrangement of the resonance circuit is changed by switching between the paths by the switching unit.

* * * * *